US007081632B2

(12) United States Patent
Hosoi et al.

(10) Patent No.: US 7,081,632 B2
(45) Date of Patent: Jul. 25, 2006

(54) RADIATION IMAGE STORAGE PANEL (75) Inventors: Yuichi Hosoi, Kaisei-machi (JP); Satoshi Arakawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 203 days.

(21) Appl. No.: 10/653,248

(22) Filed: Sep. 3, 2003

(65) Prior Publication Data

US 2004/0046129 A1    Mar. 11, 2004

(30) Foreign Application Priority Data

Sep. 5, 2002    (JP)    ............................. 2002-260209

(51) Int. Cl.
*G03B 42/08*    (2006.01)
(52) U.S. Cl. ..................................... 250/484.4; 313/467
(58) Field of Classification Search ............. 250/484.4; 313/467
See application file for complete search history.

(56) References Cited

U.S. PATENT DOCUMENTS 5,055,681 A    10/1991 Tsuchino et al.
2003/0168611 A1*    9/2003 Joly et al. ................. 250/484.4
2004/0051438 A1*    3/2004 Leblans et al. ............. 313/467

FOREIGN PATENT DOCUMENTS

JP    60-165642 A    8/1985
JP    06-230198 A    8/1994

* cited by examiner

Primary Examiner—David Porta
Assistant Examiner—Djura Malevic
(74) Attorney, Agent, or Firm—Sughrue Mion, PLLC (57) ABSTRACT A radiation image storage panel comprises a stimulable phosphor layer capable of emitting light when being exposed to stimulating rays, which cause the stimulable phosphor layer to emit the light in proportion to an amount of energy stored on the stimulable phosphor layer during exposure of the stimulable phosphor layer to radiation. The stimulable phosphor layer is adapted for radiating out the emitted light with an intensity distribution that is compressed in a direction, which is normal to a surface of the stimulable phosphor layer, and into an oblate distribution, which is flatter than a cos θ distribution.

6 Claims, 8 Drawing Sheets

RADIATION IMAGE STORAGE PANEL

BACKGROUND OF THE INVENTION

1. Field of the Invention

This invention relates to a radiation image storage panel. This invention particularly relates to a radiation image storage panel provided with a stimulable phosphor layer, which is capable of emitting light when being exposed to stimulating rays.

2. Description of the Related Art

Radiation image recording and reproducing systems comprising radiation image recording apparatuses, radiation image read-out apparatuses, and the like, in which stimulable phosphors are utilized, have heretofore been known as computed radiography (CR) systems. With the CR systems, a radiation image of an object, such as a human body, is recorded as a latent image on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored on the stimulable phosphor sheet during exposure of the stimulable phosphor sheet to the radiation. The light emitted by the stimulable phosphor sheet, upon stimulation thereof, is photoelectrically detected and converted into an electric image signal. In this manner, the image signal representing the radiation image of the object is acquired.

Figure 11:
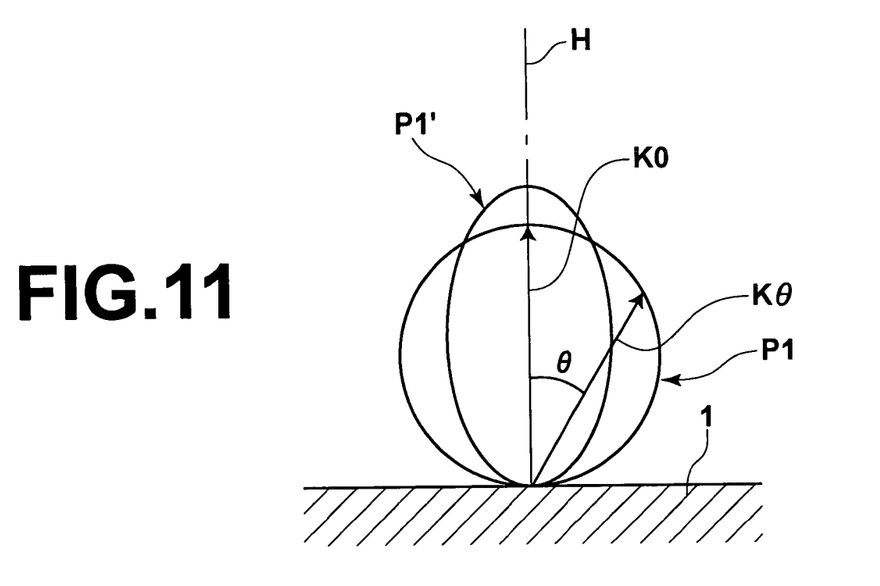
FIG. 11 is an explanatory view showing the cos θ distribution.

As a recording medium to be used in the radiation image recording and reproducing systems described above, a radiation image storage panel provided with a stimulable phosphor layer, which has been formed with a process for coating particles of a stimulable phosphor onto a substrate, or a radiation image storage panel provided with a stimulable phosphor layer comprising pillar-shaped crystals of a stimulable phosphor, which stimulable phosphor layer has been formed on a substrate with a vacuum evaporation process, is utilized. It has heretofore been known that a distribution of a light intensity of the emitted light, which is emitted from the stimulable phosphor layer of the radiation image storage panel when the stimulating rays are irradiated to the radiation image storage panel, with respect to the light radiating angle, at which the emitted light is radiated out from the stimulable phosphor layer, is biased toward a direction, which is normal to the surface of the stimulable phosphor layer. (The distribution of the light intensity of the emitted light, which is emitted from the stimulable phosphor layer of the radiation image storage panel when the stimulating rays are irradiated to the radiation image storage panel, with respect to the light radiating angle, at which the emitted light is radiated out from the stimulable phosphor layer, will herein below be referred to as the light emission angle distribution.) FIG. 11 is an explanatory view showing a cos θ distribution. Specifically, in FIG. 11, P1 represents the so-called cos θ distribution, wherein the relationship between a light intensity Kθ of the emitted light, which is radiated out from a stimulable phosphor layer 1 toward a direction H normal to the surface of the stimulable phosphor layer 1, and a light intensity kθ of the emitted light, which is radiated out from the stimulable phosphor layer 1 toward a direction making an angle θ (i.e., at a light radiating angle θ) with respect to the direction H normal to the surface of the stimulable phosphor layer 1, is represented by the formula of $k\theta = K0 \times \cos\theta$. As illustrated in FIG. 11, the emitted light, which is radiated out from the stimulable phosphor layer 1, has a light emission angle distribution (represented by P1' in FIG. 11) that is compressed in the direction, which is normal to the direction H normal to the surface of the stimulable phosphor layer 1, and into an oblate distribution, which is flatter than the cos θ distribution.

The surface of the stimulable phosphor layer has converging effects, and therefore the emitted light, which is radiated out from the stimulable phosphor layer, has the light emission angle distribution described above. Specifically, in the cases of the stimulable phosphor layer, which is formed with the process for coating the particles of the stimulable phosphor onto the substrate, the particles of the stimulable phosphor have an approximately spherical shape, and the emitted light, which has been generated within the stimulable phosphor layer and is radiated out through protruding regions of the stimulable phosphor particles protruding at the surface of the stimulable phosphor layer, is refracted at the surfaces of the protruding regions of the stimulable phosphor particles and is converged toward the direction, which is normal to the surface of the stimulable phosphor layer. Also, in the cases of the stimulable phosphor layer, which comprises the pillar-shaped crystals of the stimulable phosphor and is formed with the vacuum evaporation process, since the top end regions of the pillar-shaped crystals of the stimulable phosphor have a protruding shape, the emitted light, which has been generated at positions deeper than the protruding regions of the pillar-shaped crystals of the stimulable phosphor and is radiated out through the protruding regions, is refracted at the surfaces of the protruding regions, i.e, the top end regions, of the pillar-shaped crystals of the stimulable phosphor and is converged toward the direction, which is normal to the surface of the stimulable phosphor layer.

In certain types of radiation image read-out apparatuses, a detection surface for the detection of the light emitted by the stimulable phosphor layer is located such that the detection surface stands facing the surface of the stimulable phosphor layer in parallel, and the light emitted by the stimulable phosphor layer is thus detected. The radiation image read-out apparatuses, wherein the detection surface is located in the orientation described above, is capable of efficiently detecting the light emitted by the stimulable phosphor layer, which has the light emission angle distribution wherein, as the light radiating angle of the emitted light becomes close to zero degree (i.e., close to the direction normal to the surface of the stimulable phosphor layer), the light intensity of the emitted light becomes high.

Also, in different types of radiation image read-out apparatuses for detecting the light emitted by the stimulable phosphor layer, the emitted light, which has been radiated out from the stimulable phosphor layer, is detected from a direction (hereinbelow referred to as the oblique direction) inclined with respect to the direction normal to the surface of the stimulable phosphor layer. In further different types of radiation image read-out apparatuses, the emitted light, which has been radiated out from the stimulable phosphor layer, is detected from the oblique direction, and the stimulating rays are irradiated to the stimulable phosphor layer from the direction normal to the surface of the stimulable phosphor layer, such that a shift in emitted light detecting position on the stimulable phosphor layer may be suppressed. (The irradiation of the stimulating rays from the direction normal to the surface of the stimulable phosphor layer will hereinbelow be referred to as the perpendicular irradiation.) (The radiation image read-out apparatus, wherein the emitted light is detected from the oblique direction, and the stimulating rays are irradiated to the stimulable phosphor layer from the direction normal to the surface of the stimulable phosphor layer, is described in, for example, patent literature 1).

Figure 12:
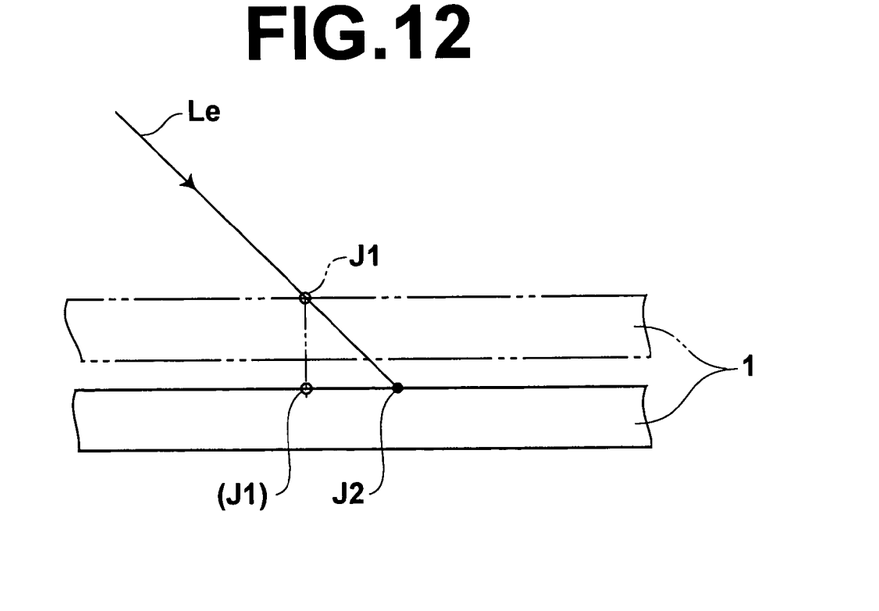
FIG. 12 is an explanatory view showing how an incidence position of stimulating rays upon a radiation image storage panel varies in cases where the stimulating rays are irradiated obliquely to the radiation image storage panel.
Figure 13:
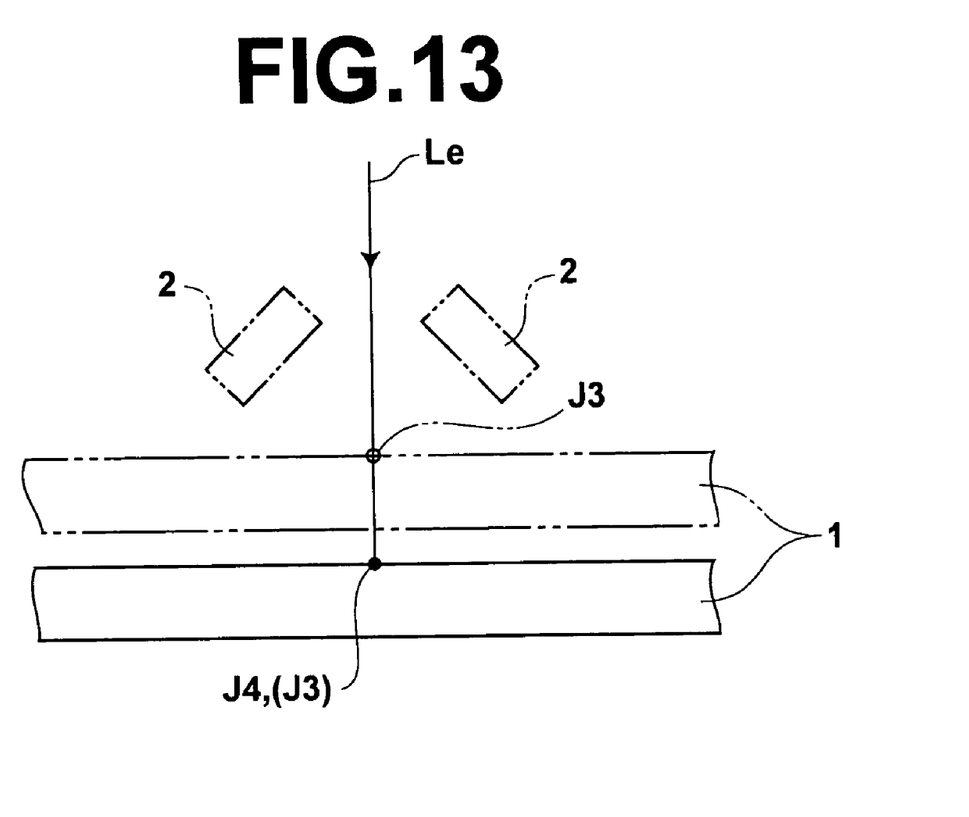
FIG. 13 is an explanatory view showing how an incidence position of stimulating rays upon a radiation image storage panel varies in cases where the stimulating rays are irradiated perpendicularly to the radiation image storage panel.

In the aforesaid further different types of radiation image read-out apparatuses, a shift in emitted light detecting position on the stimulable phosphor layer is suppressed with the effects described below. FIG. 12 is an explanatory view showing how an incidence position of stimulating rays upon a radiation image storage panel varies in cases where the stimulating rays are irradiated obliquely to the radiation image storage panel. FIG. 13 is an explanatory view showing how an incidence position of stimulating rays upon a radiation image storage panel varies in cases where the stimulating rays are irradiated perpendicularly to the radiation image storage panel. Specifically, as illustrated in FIG. 12, at the time at which the stimulating rays are irradiated to the stimulable phosphor layer from an oblique direction (the irradiation of the stimulating rays from the oblique direction will hereinbelow be referred to as the oblique irradiation), and the light emitted by the stimulable phosphor layer is being detected, if the position of the stimulable phosphor layer varies vertically with respect to the stimulating rays, the problems described below will occur. More specifically, for example, if the position of the stimulable phosphor layer 1 varies downwardly with respect to stimulating rays Le as illustrated in FIG. 12, the incidence position of the stimulating rays Le upon the stimulable phosphor layer 1 will vary from an initial incidence position J1 to an incidence position J2, and a shift in emitted light detecting position on the stimulable phosphor layer 1 will thus occur. However, as illustrated in FIG. 13, in cases where the stimulating rays Le are irradiated perpendicularly to the stimulable phosphor layer 1, and the position of the stimulable phosphor layer 1 varies downwardly with respect to the stimulating rays Le, an initial incidence position J3 of the stimulating rays Le upon the stimulable phosphor layer 1 and an incidence position J4, which occurs after the position of the stimulable phosphor layer 1 has varied downwardly with respect to the stimulating rays Le, coincide with each other, and therefore a shift in emitted light detecting position on the stimulable phosphor layer 1 does not occur. Accordingly, in cases where the position of the stimulable phosphor layer 1 varies vertically with respect to the stimulating rays Le, and a radiation image read-out apparatus is employed, wherein the stimulating rays Le are irradiated perpendicularly to the stimulable phosphor layer 1, and wherein the light emitted by the stimulable phosphor layer 1 upon its exposure to the stimulating rays Le and radiated out from the stimulable phosphor layer 1 is detected with a detecting section 2, which is located obliquely, the operation for reading out the radiation image from the stimulable phosphor layer 1 is capable of being performed without being adversely affected by the vertical variation of the position of the stimulable phosphor layer 1 to the stimulating rays Le.

Patent literature 1: U.S. Pat. No. 5,055,681

However, the emitted light, which is radiated out from the stimulable phosphor layer, has the light emission angle distribution such that, as the light radiating angle becomes large, the light intensity becomes low. Therefore, in cases where the emitted light, which has been radiated out from the stimulable phosphor layer, is detected from the oblique.

The problems described above should ordinarily be taken into consideration regardless of the cases where the stimulating rays are irradiated obliquely to the stimulable phosphor layer, i.e. regardless of the angle of incidence of the stimulating rays upon the stimulable phosphor layer.

SUMMARY OF THE INVENTION

The primary object of the present invention is to provide a radiation image storage panel, wherein an amount of emitted light capable of being detected is prevented from becoming small in cases where the emitted light, which has been radiated out from a stimulable phosphor layer of the radiation image storage panel, is detected from an oblique direction.

The present invention provides a radiation image storage panel, comprising a stimulable phosphor layer capable of emitting light when being exposed to stimulating rays, which cause the stimulable phosphor layer to emit the light in proportion to an amount of energy stored on the stimulable phosphor layer during exposure of the stimulable phosphor layer to radiation, wherein the stimulable phosphor layer is adapted for radiating out the emitted light with an intensity distribution that is compressed in a direction, which is normal to a surface of the stimulable phosphor layer, and into an oblate distribution, which is flatter than a cos θ distribution.

The radiation image storage panel in accordance with the present invention may be modified such that the surface of the stimulable phosphor layer on a light radiating side, from which the emitted light is radiated out, has been subjected to flattening processing for flattening the surface of the stimulable phosphor layer such that the emitted light is radiated out with the intensity distribution that is compressed in the direction, which is normal to the surface of the stimulable phosphor layer, and into the oblate distribution, which is flatter than the cos θ distribution.

In such cases, the flattening processing may be a processing for polishing the surface of the stimulable phosphor layer on the light radiating side and thereby flattening the stimulable phosphor layer. Alternatively, the flattening processing may be a processing for filling a material, which has a refractive index larger than 1, into depressed regions of the surface of the stimulable phosphor layer on the light radiating side and thereby flattening the stimulable phosphor layer.

With the radiation image storage panel in accordance with the present invention, the stimulable phosphor layer is adapted for radiating out the emitted light with the intensity distribution that is compressed in the direction, which is normal to the surface of the stimulable phosphor layer, and into the oblate distribution, which is flatter than the cos θ distribution. Therefore, the emitted light is radiated out from the stimulable phosphor layer such that more of the light intensity components of the emitted light maybe directed toward the oblique direction. Accordingly, in cases where the light emitted by the stimulable phosphor layer is to be detected from the oblique direction, the amount of the emitted light capable of being detected is capable of being prevented from becoming small.

Also, as described above, the radiation image storage panel in accordance with the present invention may be modified such that the surface of the stimulable phosphor layer on the light radiating side, from which the emitted light is radiated out, has been subjected to the flattening processing for flattening the surface of the stimulable phosphor layer such that the emitted light is radiated out with the intensity distribution that is compressed in the direction, which is normal to the surface of the stimulable phosphor layer, and into the oblate distribution, which is flatter than the cos θ distribution. In such cases, the light converging effects occurring due to the shape of the surface of the stimulable phosphor layer are capable of being suppressed, and the emitted light is capable of being radiated out from the stimulable phosphor layer such that more of the light intensity components of the emitted light may be reliably directed toward the oblique direction.

In such cases, as described above, the radiation image storage panel in accordance with the present invention may be modified such that the flattening processing is the processing for polishing the surface of the stimulable phosphor layer on the light radiating side and thereby flattening the stimulable phosphor layer. Alternatively, the radiation image storage panel in accordance with the present invention may be modified such that the flattening processing is a processing for filling the material, which has a refractive index larger than 1, into the depressed regions of the surface of the stimulable phosphor layer on the light radiating side and thereby flattening the stimulable phosphor layer. With each of the modifications described above, the light converging effects occurring due to the shape of the surface of the stimulable phosphor layer are capable of being suppressed more reliably, and the emitted light is capable of being radiated out from the stimulable phosphor layer such that more of the light intensity components of the emitted light may be reliably directed toward the oblique direction.

DESCRIPTION OF THE PREFERRED EMBODIMENTS

The present invention will hereinbelow be described in further detail with reference to the accompanying drawings.

Figure 1:
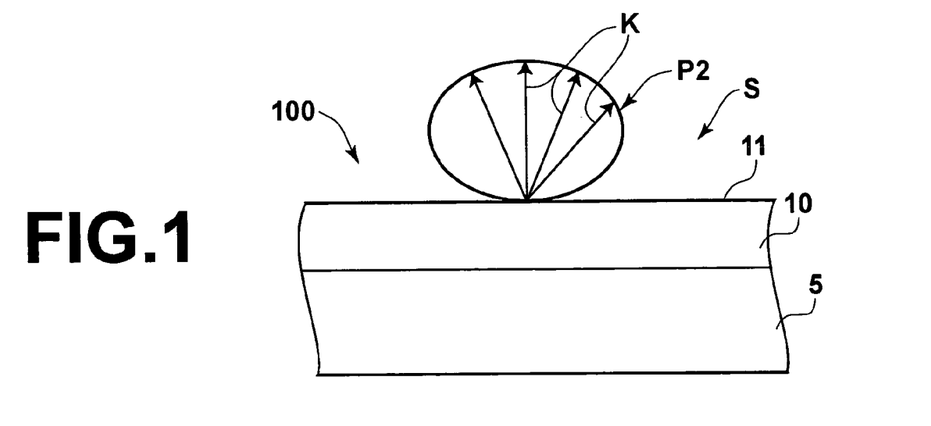
FIG. 1 is a schematic sectional view showing an embodiment of the radiation image storage panel in accordance with the present invention.
Figure 2:
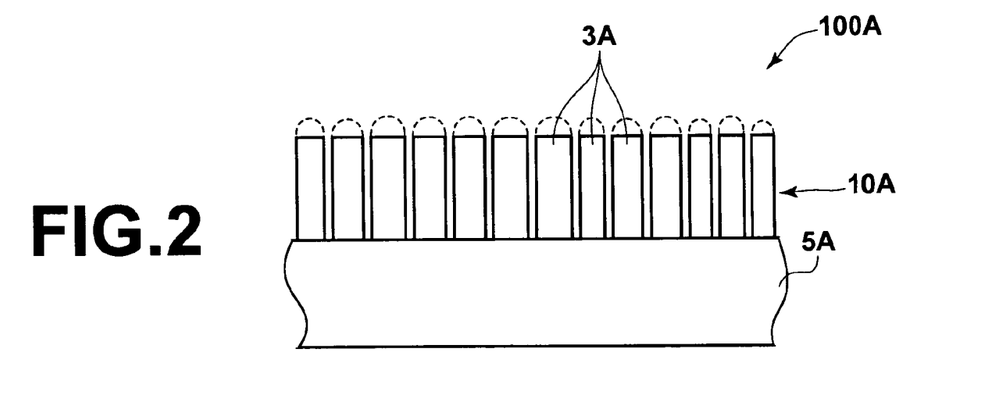
FIG. 2 is a schematic sectional view showing a radiation image storage panel of Example 1 provided with a stimulable phosphor layer, whose surface has been flattened with a polishing process.
Figure 3:
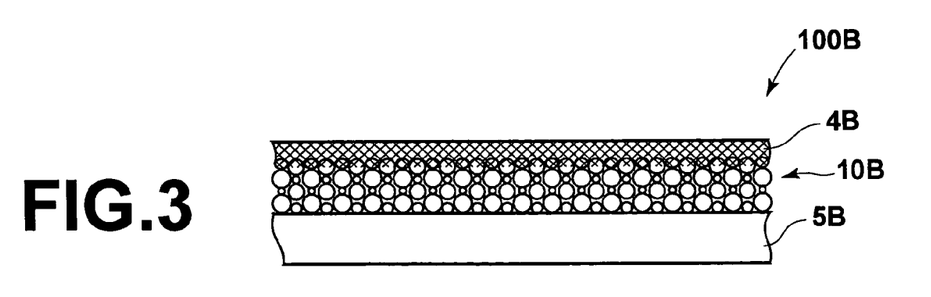
FIG. 3 is a schematic sectional view showing a radiation image storage panel of Example 2 provided with a stimulable phosphor layer, whose surface has been flattened with a process for filling an organic high-molecular weight material in depressed regions of the surface.
Figure 4:
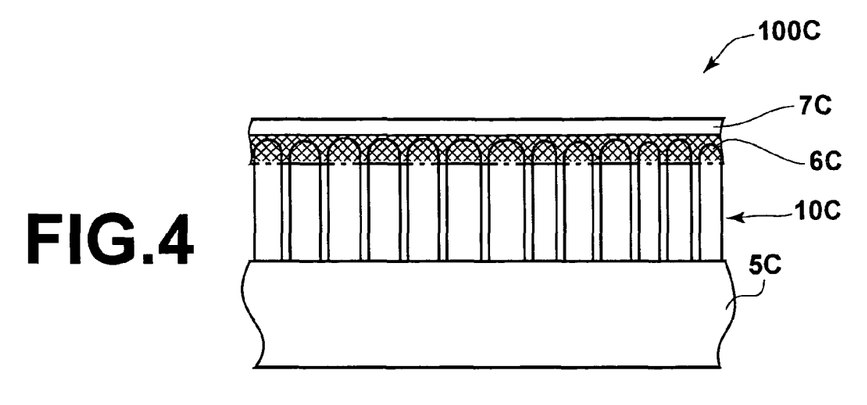
FIG. 4 is a schematic sectional view showing a radiation image storage panel of Example 3 provided with a stimulable phosphor layer, whose surface has been flattened with a process for laminating a PET film via a resin binder.
Figure 5:
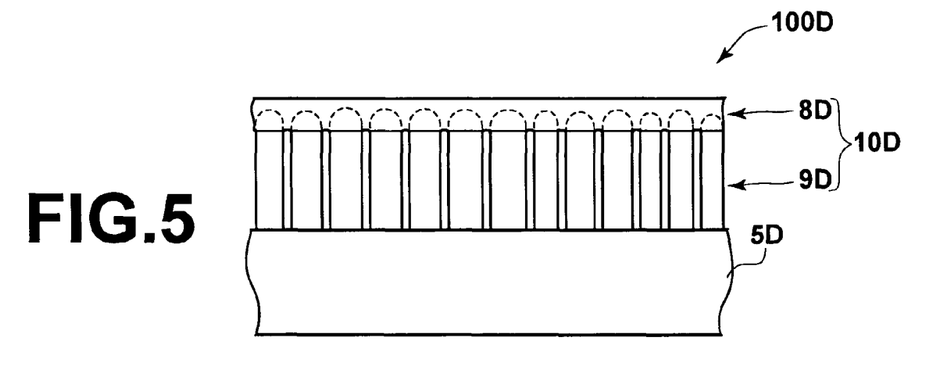
FIG. 5 is a schematic sectional view showing a radiation image storage panel of Example 4, whose surface has been flattened with a process for overlaying a second stimulable phosphor layer on a surface of a first stimulable phosphor layer having a depression-protrusion pattern.
Figure 6:
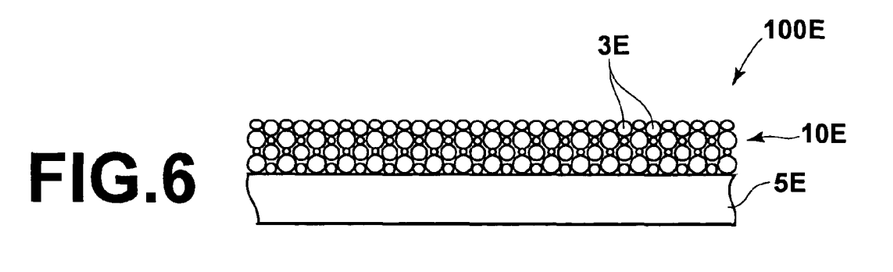
FIG. 6 is a schematic sectional view showing a radiation image storage panel of Comparative Example 1 provided with a stimulable phosphor layer, whose surface has a depression-protrusion pattern formed with stimulable phosphor particles exposed to the exterior.
Figure 7:
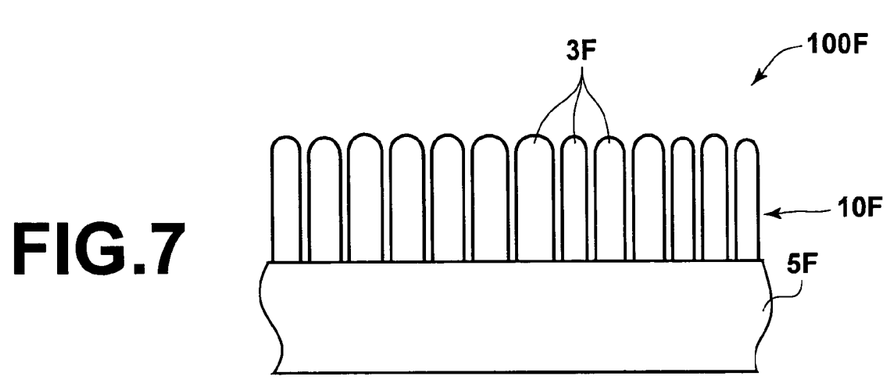
FIG. 7 is a schematic sectional view showing a radiation image storage panel of Comparative Example 2 provided with a stimulable phosphor layer, whose surface has protruding regions formed with top end regions of pillar-shaped crystals.
Figure 8:
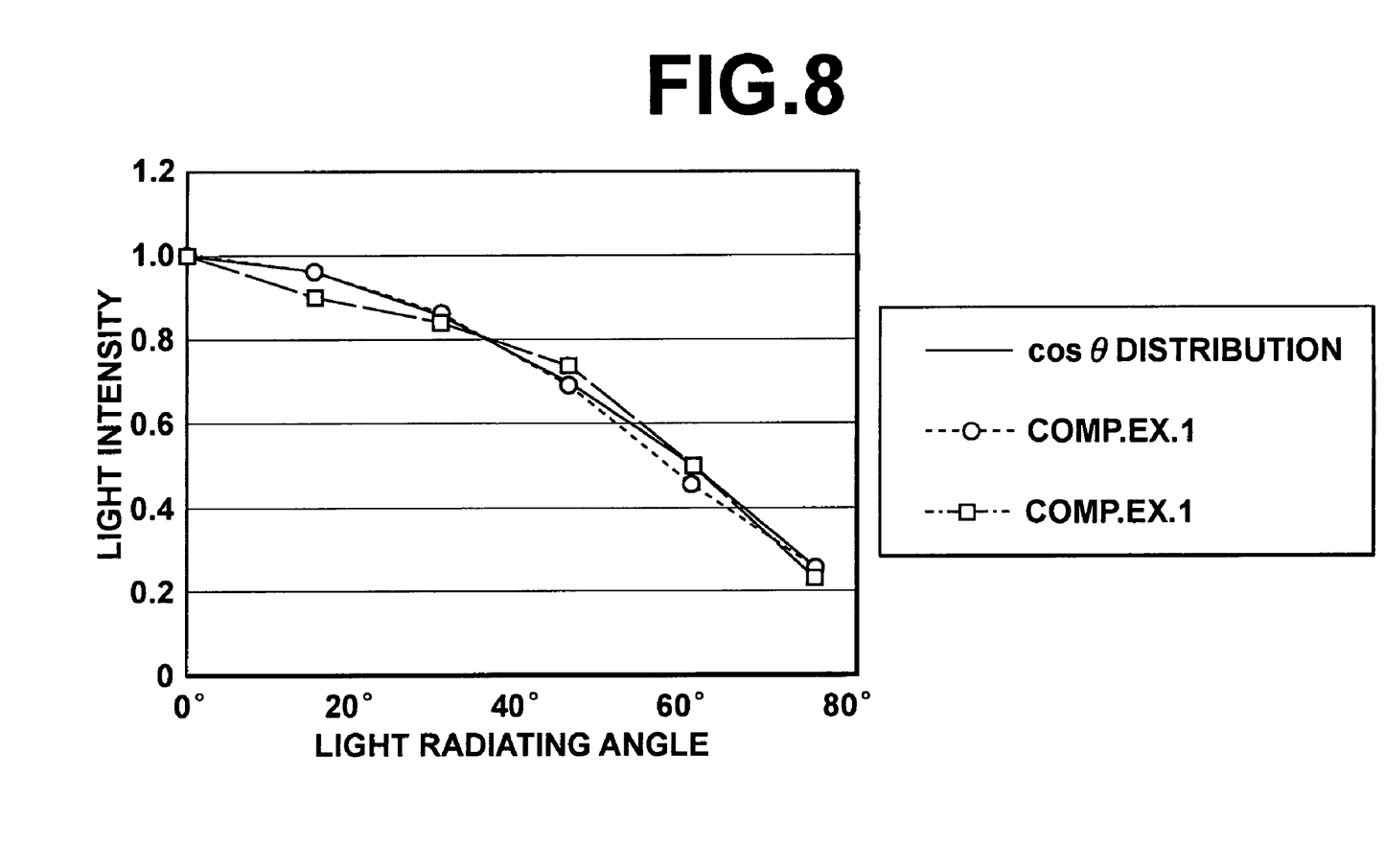
FIG. 8 is a graph showing light emission angle distributions of samples, which have been prepared in Comparative Example 1 and Comparative Example 2, and a cos θ distribution.
Figure 9:
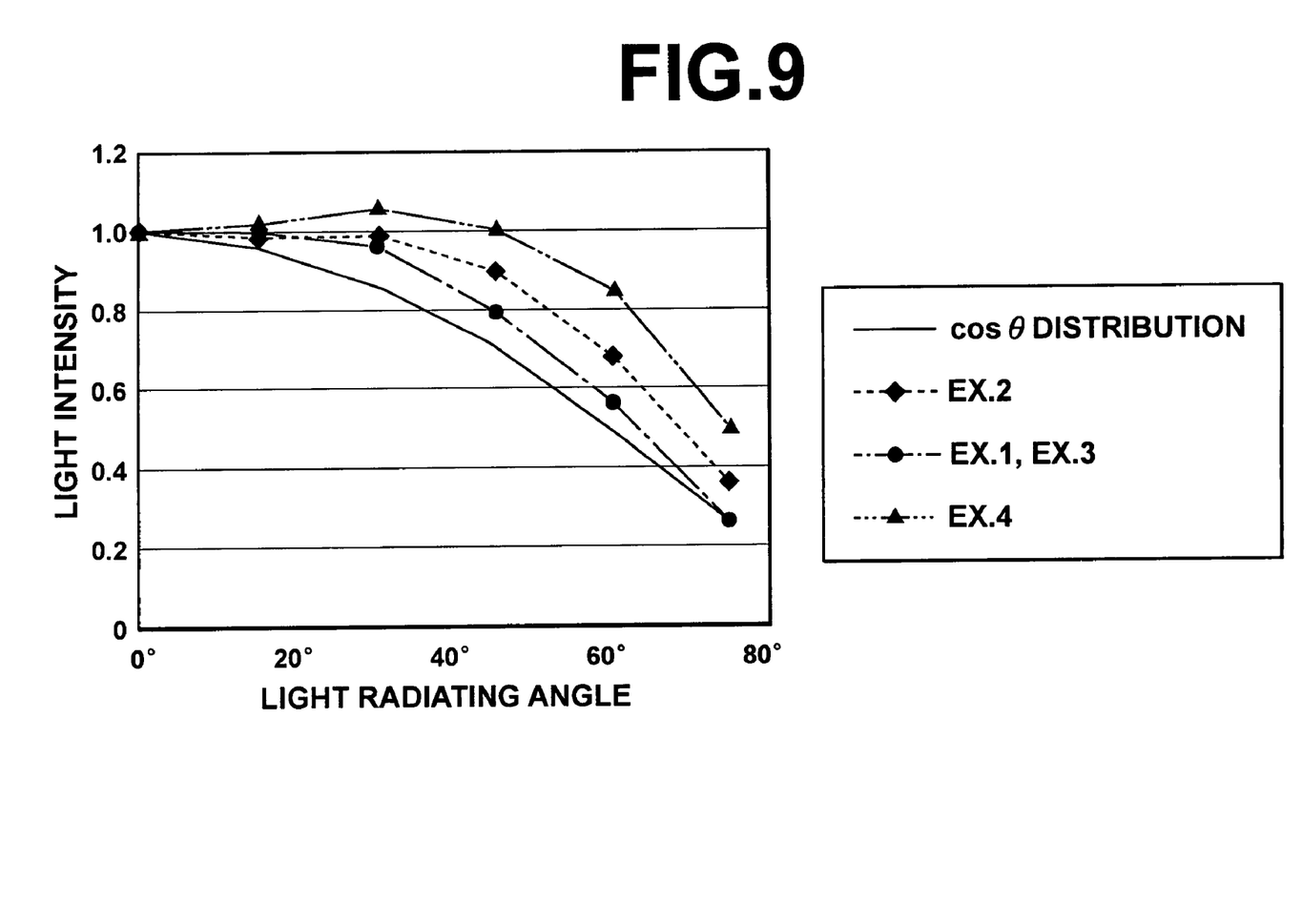
FIG. 9 is a graph showing light emission angle distributions of samples, which have been prepared in Example 1, Example 2, Example 3, and Example 4, and the cos θ distribution.
Figure 10:
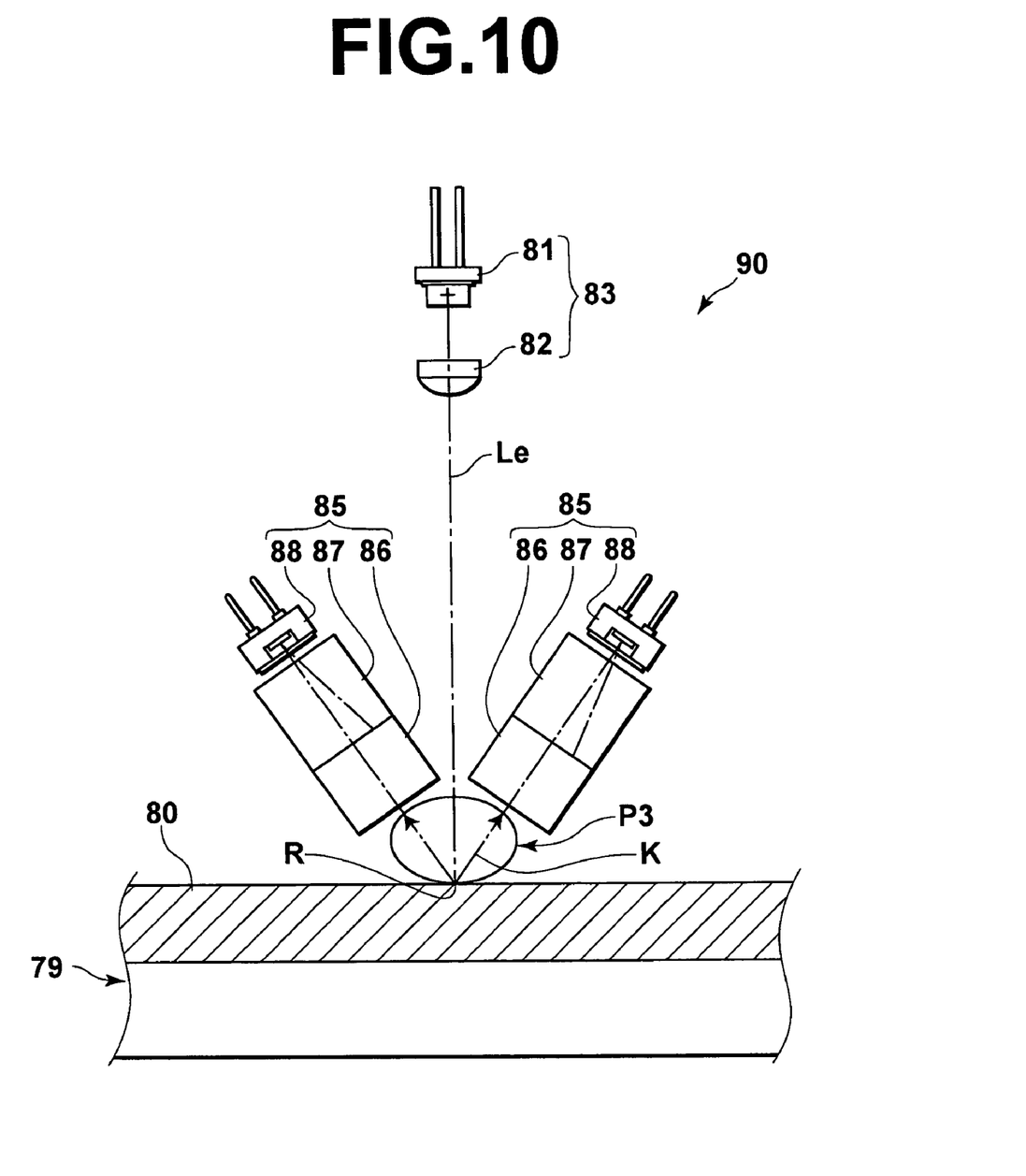
FIG. 10 is a conceptual view showing how emitted light, which has been radiated out from a stimulable phosphor layer having been subjected to a flattening processing, is detected from an oblique direction.

FIG. 1 is a schematic sectional view showing an embodiment of the radiation image storage panel in accordance with the present invention. FIG. 2 is a schematic sectional view showing a radiation image storage panel of Example 1. FIG. 3 is a schematic sectional view showing a radiation image storage panel of Example 2. FIG. 4 is a schematic sectional view showing a radiation image storage panel of Example 3. FIG. 5 is a schematic sectional view showing a radiation image storage panel of Example 4. FIG. 6 is a schematic sectional view showing a radiation image storage panel of Comparative Example 1. FIG. 7 is a schematic sectional view showing a radiation image storage panel of Comparative Example 2. FIG. 8 is a graph showing light emission angle distributions of samples, which have been prepared in Comparative Example 1 and Comparative Example 2, and a cos θ distribution. FIG. 9 is a graph showing light emission angle distributions of samples, which have been prepared in Example 1, Example 2, Example 3, and Example 4, and the cos θ distribution. FIG. 10 is a conceptual view showing how emitted light, which has been radiated out from a stimulable phosphor layer having been subjected to a flattening processing, is detected from an oblique direction.

With reference to FIG. 1, a radiation image storage panel 100, which is an embodiment of the radiation image storage panel in accordance with the present invention, comprises a substrate 5 and a stimulable phosphor layer 10, which is overlaid on the substrate 5 and is capable of emitting light when being exposed to stimulating rays. A surface 11 of the stimulable phosphor layer 10 on a light radiating side S of the stimulable phosphor layer 10, from which side the emitted light K is radiated out, has been subjected to flattening processing for flattening the surface 11 of the stimulable phosphor layer 10 such that the emitted light K is radiated out with an intensity distribution (represented by P2 in FIG. 2) that is compressed in the direction, which is normal to the surface 11 of the stimulable phosphor layer 10, and into an oblate distribution, which is flatter than the cos θ distribution.

Examples of the stimulable phosphor layers having been subjected to the flattening processing will be described hereinbelow.

[1] Firstly, first flattening processing, wherein protruding regions of a depression-protrusion pattern formed on the surface of the stimulable phosphor layer are polished, and the surface of the stimulable phosphor layer is thereby flattened, will be described hereinbelow.

EXAMPLE 1

A radiation image storage panel of Example 1 comprises a glass substrate, which acts as the substrate, and a stimulable phosphor layer, which has been formed with a process for performing first flattening processing on pillar-shaped crystals of a stimulable phosphor having been formed on the glass substrate.

A glass substrate, on which a stimulable phosphor was to be deposited with a vacuum evaporation technique, and a stimulable phosphor raw material acting as a deposition material were located at predetermined positions within a vacuum chamber of a vacuum evaporation apparatus. The glass substrate and the stimulable phosphor raw material were thus located one above the other so as to stand facing each other. The vacuum chamber was then evacuated to a vacuum of $1\times10^{-3}$ Pa. Thereafter, an Ar gas was introduced into the vacuum chamber, and the vacuum within the vacuum chamber was thus set at 0.8 Pa. The glass substrate having been located within the vacuum chamber was then heated to a temperature of 100° C. by use of a heat source constituted of a lamp heater located on the evaporated material receiving side. Thereafter, the deposition material was heated and evaporated with resistance heating. The deposition material was thus deposited on the glass substrate at a rate of 10 μm/minute. In this manner, a stimulable phosphor layer (layer thickness: 450 μm, area: 10 cm×10 cm) was formed on the glass substrate. The stimulable phosphor layer had a structure, in which pillar-shaped crystals of the stimulable phosphor stood close to one another and approximately perpendicularly. A surface of the thus formed stimulable phosphor layer had a depression-protrusion pattern, in which protruding regions at top ends of the pillar-shaped crystals were arrayed. Thereafter, the protruding regions at the surface of the stimulable phosphor layer were polished. In this manner, as illustrated in FIG. 2, a radiation image storage panel 100A comprising a glass substrate 5A and a stimulable phosphor layer 10A, which had been overlaid on the substrate 5A and was composed of pillar-shaped stimulable phosphor crystals 3A, 3A, . . . , and which had the surface flattened with the polishing process, was obtained.

[2] Secondly, second flattening processing, wherein a material having a refractive index larger than 1 is filled into depressed regions of a depression-protrusion pattern formed on the surface of the stimulable phosphor layer, and the surface of the stimulable phosphor layer is thereby flattened, will be described hereinbelow.

EXAMPLE 2

A radiation image storage panel of Example 2 comprises a substrate and a stimulable phosphor layer, which has been formed with a process for coating stimulable phosphor particles onto the substrate and thereafter performing second flattening processing.

Stimulable phosphor particles and a binder, which comprised an organic high-molecular weight material, were mixed together such that the weight ratio of the stimulable phosphor particles to the binder might fall within the range between approximately 30:1 and approximately 10:1. The resulting mixture was coated onto a substrate, and a stimulable phosphor layer was thus formed. In this case, since the proportion of the binder was small, the stimulable phosphor particles were exposed on the surface of the stimulable phosphor layer and constituted protruding regions, and a depression-protrusion pattern was thus formed on the surface of the stimulable phosphor layer. A solution containing an organic high-molecular weight material (e.g., an acrylic resin or a urethane resin capable of acting as a binder and having a refractive index of approximately 1.5), which had a refractive index larger than the refractive index of air, i.e. a refractive index larger than 1, was then coated onto the stimulable phosphor layer described above, and a layer of the organic high-molecular weight material having a thickness of 30 μm was thereby formed on the stimulable phosphor layer described above. In this manner, the second flattening processing for filling the organic high-molecular weight material, which acted as the material having a refractive index larger than 1, into the depressed regions of the depression-protrusion pattern formed on the surface of the stimulable phosphor layer described above was performed. In the manner described above, as illustrated in FIG. 3, a radiation image storage panel 100B comprising a substrate 5B and a stimulable phosphor layer 10B, which had been overlaid on the substrate 5B, and which had the surface flattened with an organic high-molecular weight material layer 4B, was obtained.

EXAMPLE 3

A radiation image storage panel of Example 3 comprises a glass substrate, which acts as the substrate, and a stimulable phosphor layer, which has been formed with a process for performing the second flattening processing on pillar-shaped crystals of a stimulable phosphor having been formed on the glass substrate.

A glass substrate, on which a stimulable phosphor was to be deposited with a vacuum evaporation technique, and a stimulable phosphor raw material acting as a deposition material were located at predetermined positions within a vacuum chamber of a vacuum evaporation apparatus. The glass substrate and the stimulable phosphor raw material were thus located one above the other so as to stand facing each other. The vacuum chamber was then evacuated to a vacuum of $1\times10^{-3}$ Pa. Thereafter, an Ar gas was introduced into the vacuum chamber, and the vacuum within the vacuum chamber was thus set at 0.8 Pa. The glass substrate having been located within the vacuum chamber was then heated to a temperature of 100° C. by use of a heat source constituted of a lamp heater located on the evaporated material receiving side. Thereafter, the deposition material was heated and evaporated with resistance heating. The deposition material was thus deposited on the glass substrate at a rate of 10 μm/minute. In this manner, a stimulable phosphor layer (layer thickness: 450 μm, area: 10 cm×10 cm) was formed on the glass substrate. The stimulable phosphor layer had a structure, in which pillar-shaped crystals of the stimulable phosphor stood close to one another and approximately perpendicularly. A surface of the thus formed stimulable phosphor layer had a depression-protrusion pattern, in which protruding regions at top ends of the pillar-shaped crystals were arrayed. Thereafter, a PET film having a film thickness of 12 μm was laminated with the surface of the stimulable phosphor layer via a resin binder. The resin binder, which acted as the material having a refractive index larger than 1, was thus filled into the depressed regions, which were located between the protruding regions formed at the top ends of the pillar-shaped crystals. In this manner, as illustrated in FIG. 4, a radiation image storage panel 100C comprising a glass substrate 5C and a stimulable phosphor layer 10C, which had been overlaid on the substrate 5C, and which had the surface flattened with the process for laminating a PET film 7C via a resin binder 6C, was obtained.

EXAMPLE 4

A radiation image storage panel of Example 4 comprises a glass substrate, which acts as the substrate, and a stimulable phosphor layer, which has been formed with a process for performing the second flattening processing on pillar-shaped crystals of a stimulable phosphor having been formed on the glass substrate.

A glass substrate (i.e., the substrate), on which a stimulable phosphor was to be deposited with a vacuum evaporation technique, and a stimulable phosphor raw material acting as a deposition material were located at predetermined positions within a vacuum chamber of a vacuum evaporation apparatus. The glass substrate and the stimulable phosphor raw material were thus located one above the other so as to stand facing each other. The vacuum chamber was then evacuated to a vacuum of $1 \times 10^{-3}$ Pa. Thereafter, an Ar gas was introduced into the vacuum chamber, and the vacuum within the vacuum chamber was thus set at 0.8 Pa. The glass substrate having been located within the vacuum chamber was then heated to a temperature of 100° C. by use of a heat source constituted of a lamp heater located on the evaporated material receiving side. Thereafter, the deposition material was heated and evaporated with resistance heating. The deposition material was thus deposited on the glass substrate at a rate of 10 μm/minute. In this manner, a first stimulable phosphor layer (layer thickness: 450 μm, area: 10 cm×10 cm) was formed on the glass substrate. The first stimulable phosphor layer had a structure, in which pillar-shaped crystals of the stimulable phosphor stood close to one another and approximately perpendicularly. A surface of the thus formed first stimulable phosphor layer had a depression-protrusion pattern, in which protruding regions at top ends of the pillar-shaped crystals were arrayed. Thereafter, the output of the lamp heater was raised such that the temperature of the glass substrate became equal to 300° C., the vacuum within the vacuum chamber was set at $1 \times 10^{-3}$ Pa, and a stimulable phosphor was deposited to a layer thickness of 20 μm with the vacuum evaporation technique on the surface of the first stimulable phosphor layer, which had been formed in the manner described above. The stimulable phosphor, which acted as the material having a refractive index larger than 1, was thus filled into the depressed regions of the depression-protrusion pattern, and a second stimulable phosphor layer was thereby formed on the first stimulable phosphor layer. In this manner, as illustrated in FIG. 5, a radiation image storage panel 100D comprising a glass substrate 5D and a stimulable phosphor layer 10D, which had been overlaid on the substrate 5D, and which had the surface flattened with the process for laminating a second stimulable phosphor layer 8D with the surface of a first stimulable phosphor layer 9D having the depression-protrusion pattern, was obtained.

[3] A radiation image storage panel provided with a stimulable phosphor layer, whose surface has not been subjected to flattening processing, will be described hereinbelow.

COMPARATIVE EXAMPLE 1

A radiation image storage panel of Comparative Example 1 comprises a substrate and a stimulable phosphor layer, which has been formed with a process for coating stimulable phosphor particles onto the substrate.

Stimulable phosphor particles and a binder, which comprised an organic high-molecular weight material, were mixed together such that the weight ratio of the stimulable phosphor particles to the binder might fall within the range between approximately 30:1 and approximately 10:1. The resulting mixture was coated onto a substrate, and a stimulable phosphor layer was thus formed. In this case, since the proportion of the binder was small, the stimulable phosphor particles were exposed on the surface of the stimulable phosphor layer and constituted protruding regions, and a depression-protrusion pattern was thus formed on the surface of the stimulable phosphor layer. In this manner, as illustrated in FIG. 6, a radiation image storage panel 100E comprising a substrate 5E and a stimulable phosphor layer 10E, which had been overlaid on the substrate 5E, and which had the surface provided with the protruding regions of stimulable phosphor particles 3E, 3E, . . . , was obtained.

COMPARATIVE EXAMPLE 2

A radiation image storage panel of Comparative Example 2 comprises a glass substrate, which acts as the substrate, and a stimulable phosphor layer, which has been formed on the glass substrate, and which is composed of pillar-shaped crystals of a stimulable phosphor.

A glass substrate acting as the substrate, on which a stimulable phosphor was to be deposited with a vacuum evaporation technique, and a stimulable phosphor raw material acting as a deposition material were located at predetermined positions within a vacuum chamber of a vacuum evaporation apparatus. The glass substrate and the stimulable phosphor raw material were thus located one above the other so as to stand facing each other. The vacuum chamber was then evacuated to a vacuum of $1 \times 10^{-3}$ Pa.

Thereafter, the glass substrate having been located within the vacuum chamber was then heated to a temperature of 100° C. by use of a heat source constituted of a lamp heater located on the evaporated material receiving side. Thereafter, the deposition material was heated and evaporated with resistance heating. The deposition material was thus deposited on the glass substrate at a rate of 10 μm/minute. In this manner, a stimulable phosphor layer (layer thickness: 500 μm, area: 10 cm×10 cm) was formed on the glass substrate. The stimulable phosphor layer had a structure, in which pillar-shaped crystals of the stimulable phosphor stood close to one another and approximately perpendicularly. A surface of the thus formed stimulable phosphor layer had a depression-protrusion pattern, in which protruding regions at top ends of the pillar-shaped crystals were arrayed. In this manner, as illustrated in FIG. 7, a radiation image storage panel 100F comprising a glass substrate 5F and a stimulable phosphor layer 10F, which had been overlaid on the substrate 5F, and which had the surface provided with the depression-protrusion pattern of arrayed protruding regions at top ends of pillar-shaped crystals 3F, 3F, . . . , was obtained. At the time of the vacuum evaporation of the stimulable phosphor onto the substrate, two deposition materials may be utilized, and dual vacuum evaporation may thereby be performed.

[4] Results of experiments conducted in order to measure light emission angle distributions of emitted light, which is radiated out from the radiation image storage panels having been formed in Examples 1, 2, 3, and 4 and Comparative Examples 1 and 2, will be described hereinbelow.

A laser beam, which acted as the stimulating rays, was irradiated perpendicularly to each of samples of the radiation image storage panels having been formed in Examples 1, 2, 3, and 4 and Comparative Examples 1 and 2, and the light emission angle distribution of the emitted light, which was radiated out from the surface of each of the samples of the radiation image storage panels.

In each of FIG. 8 and FIG. 9, the light intensity of the emitted light is plotted on the vertical axis, and the light radiating angle of the emitted light, which is radiated out from the stimulable phosphor layer, is plotted on the horizontal axis. Also, the light intensity of the emitted light, which is radiated out at a light radiating angle of zero degree, is taken as a reference light intensity (having a value of 1.0). As illustrated in FIG. 8, the light emission angle distribution of each of the samples having been formed in Comparative Examples 1 and 2, which samples have not been subjected to the flattening processing, approximately coincides with the $\cos \theta$ distribution. However, as illustrated in FIG. 9, the light emission angle distribution of each of the samples having been formed in Examples 1, 2, 3, and 4, which samples have been subjected to the flattening processing, is an intensity distribution that is compressed in the direction, which is normal to the surface of the stimulable phosphor layer, and into the oblate distribution, which is flatter than the $\cos \theta$ distribution. The light emission angle distribution of the sample having been formed in Example 1 and the light emission angle distribution of the sample having been formed in Example 3 were approximately identical with each other. Therefore, in FIG. 9, the light emission angle distribution of the sample having been formed in Example 1 and the light emission angle distribution of the sample having been formed in Example 3 are indicated as being identical with each other.

FIG. 10 schematically shows detection means for detecting the emitted light in a radiation image read-out apparatus. Specifically, with the detection means in the radiation image read-out apparatus, the radiation image storage panel provided with the stimulable phosphor layer, which has been subjected to the flattening processing, is employed. Also, the stimulating rays are irradiated perpendicularly to the stimulable phosphor layer, and the emitted light, which has been radiated out from the stimulable phosphor layer, is detected from oblique directions. In this manner, the amount of the emitted light capable of being detected is prevented from becoming small. Further, in cases where the position of the stimulable phosphor layer with respect to the stimulating rays varies vertically, a shift in incidence position of the stimulating rays upon the stimulable phosphor layer is capable of being suppressed.

With reference to FIG. 10, detection means 90 comprises a stimulating ray irradiating section 83 and line sensors 85, 85. The stimulating ray irradiating section 83 is located above a stimulable phosphor layer 80 of a radiation image storage panel 79, on which a radiation image has been stored, and irradiates linear stimulating rays Le perpendicularly to the stimulable phosphor layer 80. The line sensors 85, 85 extend linearly (i.e., in a main scanning direction) and detect the emitted light K, which has been radiated out from the stimulable phosphor layer 80 when the stimulating rays Le are irradiated to the stimulable phosphor layer 80. The line sensors 85, 85 are located obliquely with respect to the optical path of the stimulating rays Le, which are irradiated perpendicularly to the stimulable phosphor layer 80. Also, the line sensors 85, 85 are located symmetrically with respect to the optical path of the stimulating rays Le.

The stimulating ray irradiating section 83 comprises a plurality of semiconductor lasers 81, 81, . . . , which are arrayed along the main scanning direction, and a lens 82, which extends along the main scanning direction. The stimulating rays Le, which have been radiated out from the semiconductor lasers 81, 81, . . . , are converged by the lens 82, and the converged stimulating rays Le are irradiated perpendicularly to a linear region R of the radiation image storage panel 79.

Each of the line sensors 85, 85 comprises a lens section 86 provided with a plurality of distributed index lenses, which are arrayed along the main scanning direction. The plurality of the distributed index lenses form an image of the linear region R of the stimulable phosphor layer 80 on a light receiving surface of a line CCD image sensor 88, which will be described later. Each of the line sensors 85, 85 also comprises a stimulating ray cut-off filter 87 for filtering out the stimulating rays Le and transmitting only the emitted light K, which has passed through the lens section 86. Each of the line sensors 85, 85 further comprises the line CCD image sensor 88 for detecting the emitted light K, the image of which has been formed by the lens section 86.

As described above, the light emission angle distribution of the emitted light K, which has been radiated out from the stimulable phosphor layer 80 when the linear stimulating rays Le are irradiated perpendicularly to the stimulable phosphor layer 80, is the intensity distribution (indicated by P3 in FIG. 10) that is compressed in the direction, which is normal to the surface of the stimulable phosphor layer 80, and into the oblate distribution, which is flatter than the $\cos \theta$ distribution. Therefore, the emitted light K is capable of being efficiently detected with the two line sensors 85, 85, which are located so as to detect the emitted light K from the oblique directions with respect to the stimulable phosphor layer 80. While the emitted light K is being detected by the line sensors 85, 85, the radiation image storage panel 79 is moved in a sub-scanning direction, which intersects with the main scanning direction. In this manner, the region of the stimulable phosphor layer 80 is scanned in two-dimensional directions with the stimulating rays Le. In accordance with the emitted light K, which has been radiated out from the stimulable phosphor layer 80 during the scanning with the stimulating rays Le, the radiation image having been stored on the stimulable phosphor layer 80 is read out.

The processing for setting such that the emitted light is radiated out from the stimulable phosphor layer with the intensity distribution that is compressed in the direction, which is normal to the surface of the stimulable phosphor layer, and into the oblate distribution, which is flatter than the $\cos \theta$ distribution, is not limited to the flattening processing and may be any of other processes capable of setting such that the emitted light is radiated out from the stimulable phosphor layer with the intensity distribution that is compressed in the direction, which is normal to the surface of the stimulable phosphor layer, and into the oblate distribution, which is flatter than the $\cos \theta$ distribution.

Also, in the embodiments described above, the emitted light, which has been radiated out from the stimulable phosphor layer when the linear stimulating rays are irradiated to the stimulable phosphor layer, is detected with the line sensors. Alternatively, for example, a radiation image read-out apparatus may be utilized, wherein the stimulable phosphor layer is scanned with point-shaped stimulating rays along the main scanning direction, the light having thus been emitted by the stimulable phosphor layer is collected by light guide members, which are located in the oblique directions, and the thus collected light is detected by photomultipliers. In cases where the radiation image storage panel in accordance with the present invention is employed in the radiation image read-out apparatus described above, the same effects as those described above are capable of being obtained.

What is claimed is:

1. A radiation image storage panel, comprising
a stimulable phosphor layer capable of emitting light when being exposed to stimulating rays, which cause the stimulable phosphor layer to emit the light in proportion to an amount of energy stored on the stimulable phosphor layer during exposure of the stimulable phosphor layer to radiation;
wherein the stimulable phosphor layer is adapted for radiating out the emitted light with an intensity distribution that is compressed in a direction, which is normal to a surface of the stimulable phosphor layer, and into an oblate distribution, which is flatter than a cos θ distribution;
wherein the surface of the stimulable phosphor layer on a light radiating side, from which the emitted light is radiated out, has been subjected to flattening processing for flattening the surface of the stimulable phosphor layer such that the emitted light is radiated out with the intensity distribution that is compressed in the direction, which is normal to the surface of the stimulable phosphor layer, and into the oblate distribution, which is flatter than the cos θ distribution; and
wherein the flattening processing is a processing for filling a material, which has a refractive index larger than 1, into depressed regions of the surface of the stimulable phosphor layer on the light radiating side and thereby flattening the stimulable phosphor layer.

2. A radiation image storage panel as defined in claim 1 wherein the material, which has a refractive index larger than 1, is a high-molecular weight material.

3. A radiation image storage panel as defined in claim 1 wherein the material, which has a refractive index larger than 1, is a stimulable phosphor.

4. A radiation image storage panel, comprising:
a stimulable phosphor layer, which emits light when exposed to stimulating rays;
wherein the stimulable phosphor layer radiates the emitted light with an intensity distribution that is compressed in a direction normal to a surface of the stimulable phosphor layer, and into an oblate distribution, which is flatter than a cos θ distribution;
wherein the surface of the stimulable phosphor layer on a side from which the emitted light is radiated out is flattened; and
wherein a filling material having a refractive index larger than1is deposited into depressed regions of the surface of the stimulable phosphor layers on the flattened side.

5. The radiation image storing panel according to claim 4, wherein the filling material is a high-molecular weight material.

6. The radiation image storing panel according to claim 4, wherein the filling material is a stimulable phosphor.

* * * * *